(12) United States Patent
Lee (10) Patent No.: US 11,595,455 B2
(45) Date of Patent: Feb. 28, 2023

(54) METHOD OF MANAGING A NETWORK AND IMAGE OBTAINING APPARATUS

(71) Applicant: HANWHA TECHWIN CO., LTD., Seongnam-si (KR)

(72) Inventor: Young Ki Lee, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 17/900,767

(22) Filed: Aug. 31, 2022

(65) Prior Publication Data

US 2022/0417307 A1 Dec. 29, 2022

Related U.S. Application Data

(63) Continuation of application No. 15/398,205, filed on Jan. 4, 2017, now abandoned.

(30) Foreign Application Priority Data

Jan. 11, 2016 (KR) .................. 10-2016-0003306
Nov. 16, 2016 (KR) .................. 10-2016-0152972

(51) Int. Cl.
*G06F 15/173* (2006.01)
*H04L 65/611* (2022.01)
*H04L 67/10* (2022.01)
*H04L 67/12* (2022.01)
*H04L 65/70* (2022.01)
*G06F 15/16* (2006.01)

(52) U.S. Cl.
CPC ............ *H04L 65/611* (2022.05); *H04L 65/70* (2022.05); *H04L 67/10* (2013.01); *H04L 67/12* (2013.01)

(58) Field of Classification Search
CPC ....... H04L 65/611; H04L 65/70; H04L 67/10; H04L 67/12
USPC ........................................ 709/224
See application file for complete search history.

(56) References Cited

U.S. PATENT DOCUMENTS

2005/0138462 A1 6/2005 Hunt et al.
2006/0215611 A1 9/2006 Nakagawa et al.

OTHER PUBLICATIONS

Office action for KR application No. 10-2016-0152972 dated Aug. 31, 2022.

*Primary Examiner* — Karen C Tang
(74) *Attorney, Agent, or Firm* — McLean IP Global; Jason Y. Pahng

(57) ABSTRACT

A method of managing a network performed by a first terminal, the method including: broadcasting a first packet to a network; receiving at least one second packet transmitted by at least one second terminal on the network, in response to the first packet; updating a master terminal in the network and the first packet based on the at least one second packet; and broadcasting the updated first packet to the network.

14 Claims, 5 Drawing Sheets

METHOD OF MANAGING A NETWORK AND IMAGE OBTAINING APPARATUS

CROSS-REFERENCE TO RELATED APPLICATION

This application is a continuation of U.S. application Ser. No. 15/398,205 filed on Jan. 4, 2017. In addition, this application claims priority from and the benefit of Korean Patent Application No. 10-2016-0003306, filed on Jan. 11, 2016, and Korean Patent Application No. 10-2016-0152972, filed on Nov. 16, 2016, in the Korean Intellectual Property Office, both of which are hereby incorporated by reference for all purposes as if fully set forth herein.

BACKGROUND

Field

Exemplary embodiments of the present invention relate to a method of managing a network and an image obtaining apparatus.

Discussion of the Background

Image obtaining apparatuses are currently being installed in many locations, and technologies of recording, storing, and transmitting images obtained by the image obtaining apparatuses are under constant development.

In particular, according to the increased number of installed image obtaining apparatuses, multi-channel monitors that monitor observation target regions by receiving images from a plurality of cameras are being actively developed. Monitoring cameras included in such multi-channel monitors are connected to the same network to transmit an image obtained by each image obtaining apparatus.

Situations in which points of time when the image obtaining apparatuses generate and transmit I-frames coincide frequently occur for various reasons, such as power being applied to the image obtaining apparatuses at the same time. In this case, when the plurality of image obtaining apparatuses simultaneously transmit the I-frames, the load on the network instantaneously increases, and thus, some image data transmitted by the image obtaining apparatuses may be lost.

SUMMARY

Exemplary embodiments of the invention include a method of managing a network that enables efficient use of a network by distributing points of time when a plurality of image obtaining apparatuses transmit I-frames.

Exemplary embodiments of the invention also include a method of managing a network and an image obtaining apparatus enabling a network to be managed through only the image obtaining apparatus without a separate managing subject.

Exemplary embodiments invention also include a method of managing a network and an image obtaining apparatus capable of preventing deterioration of a certain image obtaining apparatus by continuously updating a managing subject.

Additional aspects will be set forth in part in the description which follows and, in part, will be apparent from the description, or may be learned by practice of the presented embodiments.

An exemplary embodiment of the invention discloses a method of managing a network performed by a first terminal, the method including: broadcasting a first packet to a network; receiving at least one second packet transmitted by at least one second terminal on the network in response to the first packet; updating a master terminal in the network and the first packet based on the at least one second packet; and broadcasting the updated first packet to the network.

When the at least one second packet is not received within a pre-set time interval from a point of time when the first packet was broadcast, the updating of the master terminal and the first packet may include: setting the first terminal as the master terminal; and initializing the first packet based on information of the first terminal.

When the at least one second packet is received, the updating of the master terminal and the first packet includes: setting the first terminal as the master terminal; and updating the first packet based on at least one of information of the first terminal and the at least one second packet.

The first terminal and the at least one second terminal may each be an image obtaining apparatus.

The first packet may include a channel of the first terminal, a channel of each of the at least one second terminal, and a time slot, and the updating of the first packet may include: determining the channel of each of the at least one second terminal based on the at least one second packet; assigning the channel of the first terminal based on the at least one second packet; and updating the time slot, in which an image transmitting point of time of the at least one second terminal that transmitted the at least one second packet and an image transmitting point of time of the first terminal are assigned according to a pre-set method, based on the at least one second packet.

The pre-set method may include setting the image transmitting points of time such that time intervals of transmitting I-frames of images obtained by the first terminal and the at least one second terminal are largest.

The method may further include, after the broadcasting of the updated first packet to the network: receiving at least one third packet transmitted by the at least one second terminal on the network in response to the updated first packet; and determining a malfunction of the at least one second terminal based on the at least one third packet.

The first packet may include at least one of a channel of the first terminal, a channel of each of the at least one second terminal, a time slot in which an image transmitting point of time of the at least one second terminal and an image transmitting point of time of the first terminal are assigned according to a pre-set method, and a point of time when the master terminal is updated to the first terminal.

The at least one second packet may include a channel of each of the at least one second terminal and a time slot in which an image transmitting point of time of the at least one second terminal and an image transmitting point of time of the first terminal are assigned according to a pre-set method.

An exemplary embodiment of the invention also discloses a method of managing a network performed by a second terminal including: receiving a first packet broadcast by a first terminal through a network; updating a time slot based on the received first packet; and transmitting, to the first terminal, a second packet including at least one of the updated time slot and a channel of the second terminal.

The updating of the time slot may include, when a time slot included in the first packet is different from a current time slot of the second terminal, updating the current time slot of the second terminal to the time slot included in the first packet.

The method may further include: determining whether a master terminal satisfies a master terminal changing condition; when it is determined that the master terminal satisfies the master terminal changing condition, transmitting a fourth packet to the master terminal; updating the master terminal to the second terminal; updating the first packet based on information of the second terminal; and broadcasting the updated first packet to the network.

An exemplary embodiment of the invention also discloses a first image obtaining apparatus including a controller configured to: broadcast a first packet to a network; receive at least one second packet transmitted by at least one second image obtaining apparatus on the network in response to the first packet; update a master terminal in the network and the first packet based on the at least one second packet; and broadcast the updated first packet to the network.

The controller may be further configured to, when the at least one second packet is not received within a pre-set time interval after the first packet was broadcast: set the first image obtaining apparatus as the master terminal; and initialize the first packet based on information of the first image obtaining apparatus.

The controller may be further configured to, when the at least one second packet is received: set the first image obtaining apparatus as the master terminal; and update the first packet based on at least one of information of the first image obtaining apparatus and the at least one second packet.

The first packet may include a channel of the first image obtaining apparatus, a channel of each of the at least one second image obtaining apparatus, and a time slot, and the controller may be further configured to: determine a channel of each of the at least one second image obtaining apparatus based on the at least one second packet; assign the channel of the first image obtaining apparatus based on the at least one second packet; and updating the time slot in which an image transmitting point of time of the at least one second image obtaining apparatus that transmitted the at least one second packet and an image transmitting point of time of the first image obtaining apparatus are assigned according to a pre-set method, based on the at least one second packet.

The pre-set method may include assigning the image transmitting points of time such that time intervals of transmitting I-frames of images obtained by the first image obtaining apparatus and the at least one second image obtaining apparatus are largest.

The controller may be further configured to: receive at least one third packet transmitted by the at least one second image obtaining apparatus on the network in response to the updated first packet; and determine a malfunction of the at least one second image obtaining apparatus based on the at least one third packet.

An exemplary embodiment of the invention also discloses a second image obtaining apparatus including a controller configured to: receive a first packet broadcast by a first image obtaining apparatus through a network; update a time slot based on the received first packet; and transmit a second packet including at least one of the updated time slot and a channel of the second image obtaining apparatus to the first image obtaining apparatus.

The controller may be further configured to, when a time slot included in the first packet is different from a current time slot of the second image obtaining apparatus, updating the current time slot of the second image obtaining apparatus to the time slot included in the first packet.

The controller may be further configured to: determine whether a master terminal satisfies a master terminal changing condition; when it is determined that the master terminal satisfies the master terminal changing condition, transmit a fourth packet to the master terminal; update the master terminal to the second image obtaining apparatus; update the first packet based on information of the second image obtaining apparatus; and broadcast the updated first packet to the network.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE ILLUSTRATED EMBODIMENTS

As the disclosure allows for various changes and numerous exemplary embodiments of the invention, particular exemplary embodiments will be illustrated in the drawings and described in detail in the written description. However, this is not intended to limit the present disclosure to particular modes of practice, and it will to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the disclosure.

While such terms as "first", "second", etc., may be used to describe various components, such components must not be limited to the above terms. The above terms are used only to distinguish one component from another.

The terms used in one or more exemplary embodiments below are merely used to describe particular embodiments, and are not intended to limit the present disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

As used herein, the term "and/or" includes any and all combinations of one or more of the associated listed items. Expressions such as "at least one of," when preceding a list of elements, modify the entire list of elements and do not modify the individual elements of the list.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Figure 1:
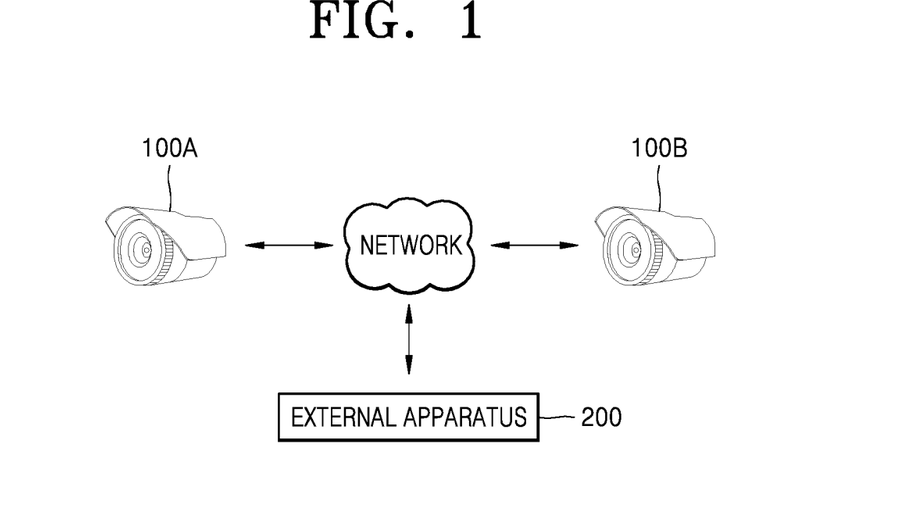
FIG. 1 is a schematic diagram of a network management system according to an exemplary embodiment of the invention.

FIG. 1 is a schematic diagram of a network management system according to an exemplary embodiment of the invention.

Referring to FIG. 1, the network management system may include at least one terminal, for example, second terminals 100A and 100B, and an external apparatus 200.

The external apparatus 200 may receive multimedia objects, such as images or sound, from the second terminals 100A and 100B through a network, and store and/or display the multimedia object.

Accordingly, the external apparatus 200 may be any one of various units for storing and then re-providing information handled by an electronic communication device. For example, the external apparatus 200 may be one of a video management system (VMS), a central management system (CMS), a network video recorder (NVR), and a digital video recorder (DVR). Alternatively, the external apparatus 200 may be a personal computer (PC) or a portable terminal. However, the external apparatus 200 is not limited thereto, and may be any apparatus as long as it receives multimedia objects from the second terminals 100A and 100B through the network, and displays and/or stores the multimedia objects.

The external apparatus 200 may have an intrinsic identifier for identifying the external apparatus 200 on the network. Here, an identifier of the external apparatus 200 may be any one of an internet protocol (IP) address, and a MAC address of the external apparatus 200. At least one external apparatus 200 is included in the present disclosure.

Examples of the network described herein may include a wireless network, a wired network, a public network such as the Internet, a private network, a global system for mobile communication network (GSM), a general packet radio network (GPRS), a local area network (LAN), a wide area network (WAN), a metropolitan area network (MAN), a cellular network, a public switched telephone network (PSTN), a personal area network, Bluetooth, Wi-Fi direct, a near field communication, an ultra wide band, combinations thereof, and other arbitrary networks, but are not limited thereto.

The second terminals 100A and 100B may be any one of various apparatuses transmitting a multimedia object, such as an image or sound, to the external apparatus 200. For example, the second terminals 100A and 100B may each be an image obtaining apparatus.

Hereinafter, for convenience of description, an 'image obtaining apparatus' and a 'terminal' have the same meaning, but the present disclosure is not limited thereto.

An image obtaining apparatus described herein may be an apparatus including a lens and an image sensor. The lens may denote a lens group including at least one lens. The image sensor may convert an image input from the lens into an electric signal. For example, the image sensor may be a semiconductor device capable of converting an optical signal into an electric signal (hereinafter, described as an image), such as a charge-coupled device (CCD) or a complementary metal oxide semiconductor (CMOS).

The image obtaining apparatus may be a camera that provides an RGB image with respect to a target space, an infrared image, or a distance image including distance information.

The image obtaining apparatus may encode an obtained image via any one of various methods, and transmit the encoded image. Herein, the encoding may be performed by the image obtaining apparatus by encoding and compressing the obtained image. The encoded image may include an infra frame (I-frame), a predicted frame (P-frame), and a bidirectional frame (B-frame). The I-frame is a key frame and is an independent frame that is not depending from another frame, and may be a relatively high frame capacity. However, the P-frame and the B-frame refer to an existing I-frame or a P-frame such that the P-frame only includes data regarding a region where motion is generated and the B-frame only includes data regarding a region having a difference, and thus may be relatively low frame capacity.

The image obtaining apparatus may generate and transmit, to the external apparatus 200, an I-frame through a network according to a pre-set condition, for example, at regular time intervals.

There may be at least one terminal in the network management system, according to an exemplary embodiment of the invention. For example, there may be two terminals, i.e., the second terminals 100A and 100B, as shown in FIG. 1, or there may be only one terminal or a plurality of terminals. The number of terminals may be determined according to an environment and/or conditions for installing the network management system.

Hereinafter, for convenience of description, a terminal may be a first terminal or a second terminal. The first terminal may be a terminal newly connected to a network. The second terminal may be a terminal pre-connected to the network. However, herein, the first and second terminals are classified according to functions for convenience of description, and thus, may have the same structure as each other.

Figure 2:
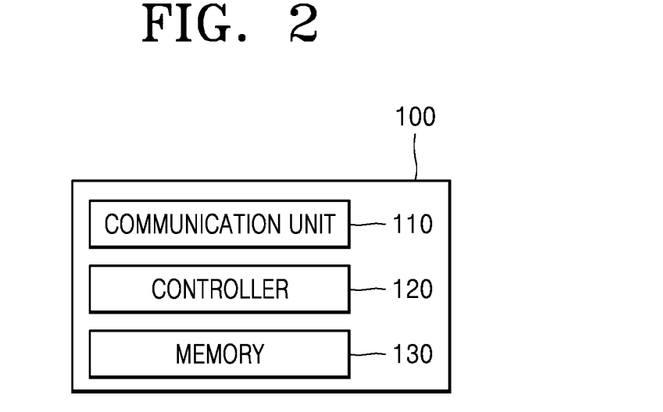
FIG. 2 is a block diagram of a terminal according to an exemplary embodiment of the invention.

FIG. 2 is a block diagram of a terminal 100 according to an exemplary embodiment of the invention. Here, the terminal 100 may be any one of the second terminals 100A and 100B of FIG. 1 and first terminals 100C and 100D, which will be described later. Accordingly, components included in the terminal 100 are also included in the second terminals 100A and 100B and the first terminals 100C and 100D.

Referring to FIG. 2, the terminal 100 may include a communication unit 110, a controller 120, and a memory 130.

The communication unit 110, according to an exemplary embodiment of the invention, may be an apparatus including hardware or software required for the terminal 100 to transmit a control signal and/or an image to another terminal and/or the external apparatus 200 on a network through a wired or wireless connection.

The controller 120, according to an exemplary embodiment of the invention, may be any type of apparatus capable of processing data, such as a processor. Here, the 'processor' may be, for example, a hardware-embedded data processing apparatus having a physically structured circuit so as to perform a function expressed in a code or command included in a program. As such, examples of the hardware-embedded data processing apparatus include processing apparatuses, such as a microprocessor, a central processing unit (CPU), a processor core, a multiprocessor, an application-specific integrated circuit (ASIC), and a field programmable gate array (FPGA), but are not limited thereto.

The memory 130 performs a function of temporarily or permanently storing data processed by the terminal 100. Examples of the memory 130 may include a magnetic storage medium and a flash storage medium, but are not limited thereto.

Hereinafter, operations of a newly connected terminal (a first terminal) when the terminal 100 is newly connected to a network will be described first, and then operations of an existing terminal (a second terminal) when the terminal 100 is newly connected to a network will be described later.

<First Terminal>

When the terminal 100 is connected to a network, the controller 120 of the terminal 100 may broadcast a first packet to the network.

Herein, the broadcasting of the first packet may mean that the terminal 100 transmits the first packet to other at least one terminal connected to the network. In other words, the terminal 100 may transmit the first packet to the other at least one terminal on the network to provide notification that the terminal 100 has been newly added to the network.

Here, the first packet may be a packet requesting the other at least one terminal on the network for a response packet (a second packet or a third packet described later). The first packet may include at least one of a channel of the terminal 100, a channel of the other at least one terminal on the network, a time slot in which image transmitting points of time of terminals on the network are assigned, and an updating point of time of a master terminal. However, the first packet that is initially transmitted by the terminal 100 when the terminal 100 is newly added to the network may not include information about some of the above items. Information about items, which is not included in the first packet, may be updated based on a second packet received from another terminal on the network later, as will be described below.

The controller 120 may receive a second packet transmitted by another terminal on the network in response to the first packet.

The second packet is a response packet of the first packet described above, and may include a channel of a terminal that received the first packet (i.e., a terminal that transmitted the second packet) and a time slot in which image transmitting points of time of the terminals on the network are assigned.

Figure 3A:
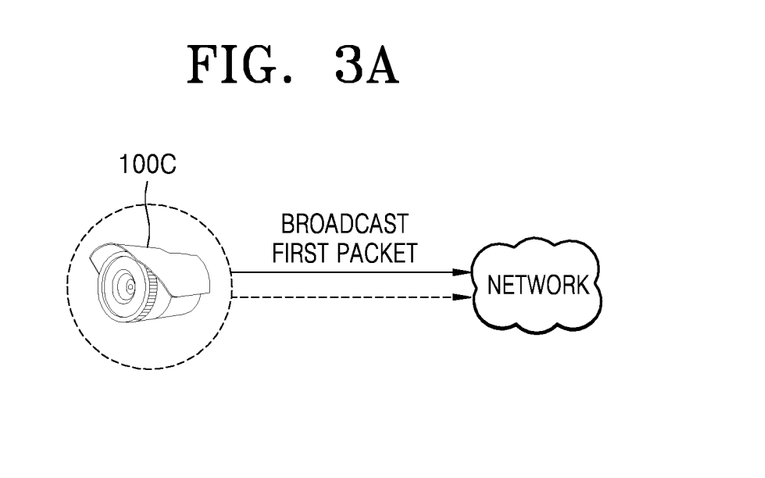
FIG. 3A is a diagram for describing operations of a first terminal when the first terminal is a terminal initially connected to a network, according to an exemplary embodiment of the invention.

FIG. 3A is a diagram for describing operations of a first terminal 100C when the first terminal 100C is a terminal initially connected to a network, according to an exemplary embodiment of the invention.

Referring to FIG. 3A, assume that the first terminal 100C is a terminal initially connected to the network.

First, the controller 120 of the first terminal 100C may broadcast a first packet to the network as described above. Also, the controller 120 of the first terminal 100C may wait for a second packet transmitted by a second terminal in response to the first packet.

However, in FIG. 3A, since the first terminal 100C is a terminal initially connected to the network, the controller 120 of the first terminal 100C is unable to receive a second packet from a second terminal.

The controller 120 of the first terminal 100C may set the first terminal 100C to be a master terminal when a second packet is not received within a pre-set time interval after the first packet was broadcast.

Herein, a 'master terminal' may be a subject of managing a channel of at least one terminal connected to a network, and a time slot in which an image transmitting point of time of the at least one terminal on the network is assigned.

The controller 120 may initialize the first packet based on information of the first terminal 100C. In detail, the controller 120 may initialize each item of the first packet to a blank and/or a very first setting value based on a premise that the first terminal 100C is the only terminal existing in the network. For example, the controller 120 may set a first channel as a channel of the first terminal 100C and initialize other channels to blanks by referring to channel information included in the first packet. Also, the controller 120 may assign a first slot of the time slot included in the first packet to an image transmitting point of time of the first terminal 100C.

Figure 3B:
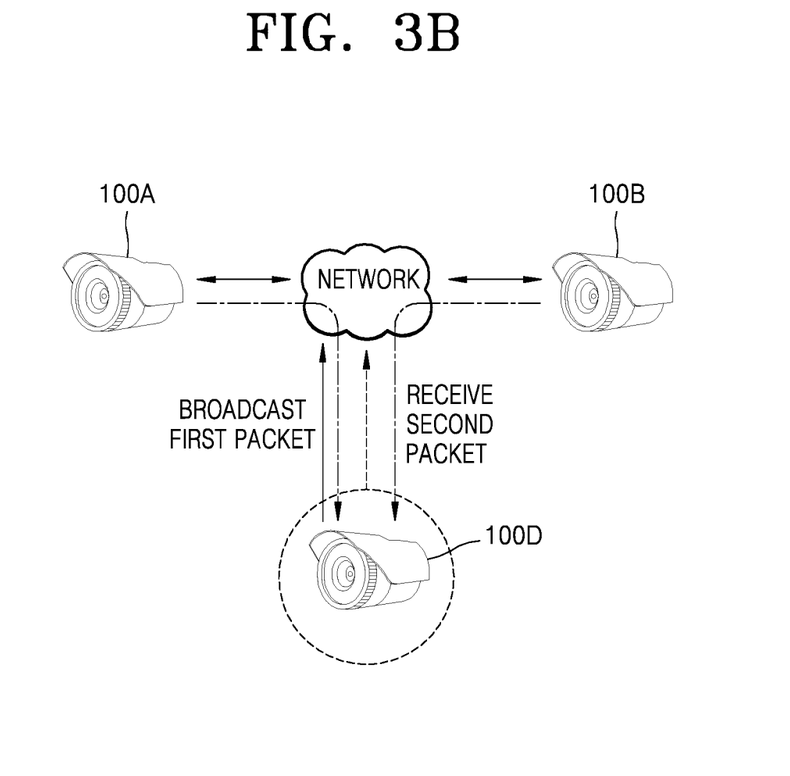
FIG. 3B is a diagram for describing operations of a first terminal when the first terminal is not a terminal initially connected to a network, according to an exemplary embodiment of the invention.

FIG. 3B is a diagram for describing operations of a first terminal 100D when the first terminal is not a terminal initially connected to a network, according to an exemplary embodiment of the invention.

Referring to FIG. 3B, assume that the two second terminals 100A and 100B were connected to the network prior to connection of the first terminal 100D to the network.

As described above, the controller 120 of the first terminal 100D may broadcast a first packet to the network. Also, the controller 120 of the first terminal 100D may receive at least one second packet transmitted by at least one of the second terminals 100A and 100B in response to the first packet.

In this case, the controller 120 of the first terminal 100D may set the first terminal 100D to a master terminal. In other words, when the at least one second packet is received, the controller 120 of the first terminal 100D may set the first terminal 100D to the master terminal.

Herein, a 'master terminal' may be a subject of managing a channel of at least one terminal connected to a network, and a time slot in which an image transmitting point of time of the at least one terminal on the network is assigned.

The controller 120 of the first terminal 100D may update the first packet based on at least one of information of the first terminal 100D and the at least one second packet. For example, the controller 120 of the first terminal 100D may assign a channel of the first terminal 100D based on the at least one second packet. Also, the controller 120 of the first terminal 100D may update a time slot in which image transmitting points of time of the second terminals 100A and 100B and an image transmitting point of time of the first terminal 100D are assigned according to a pre-set method, based on the at least one second packet. Here, the controller 120 of the first terminal 100D may assign a channel of each of the second terminals 100A and 100B based on the at least one second packet.

Figure 4:
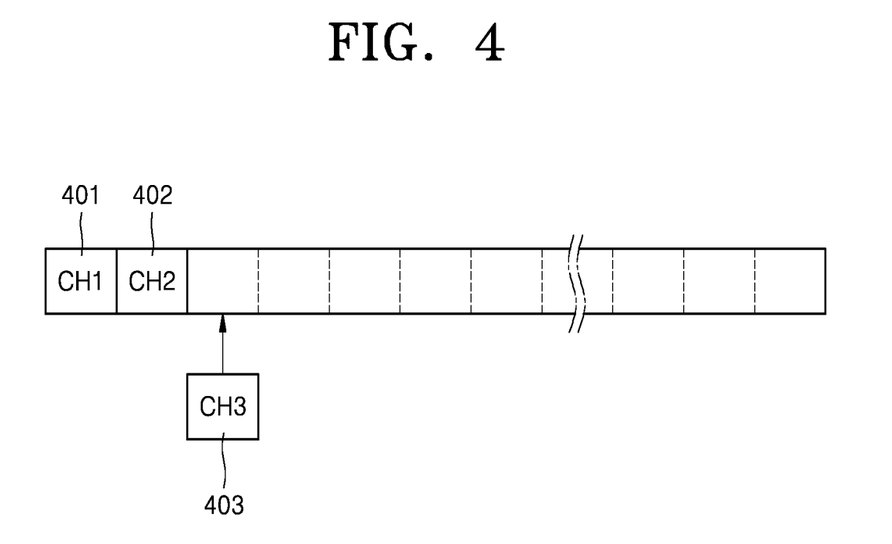
FIG. 4 is a diagram for describing a method of assigning, by a controller, a channel of a first terminal, according to an exemplary embodiment of the invention.

FIG. 4 is a diagram for describing a method of assigning, by the controller 120 of the first terminal 100D, a channel of the first terminal 100D, according to an exemplary embodiment of the invention. For convenience of description, as described above in FIG. 3B, it is assumed that the first terminal 100D is connected to a network while the second terminals 100A and 100B are connected to the network.

The controller 120 may assign an empty channel as the channel of the first terminal 100 by referring to second packets transmitted by the second terminals 100A and 100B. As described above, the second packets are response packets with respect to the first packet, and may include channels of the second terminals 100A and 100B that transmitted the second packets. Accordingly, the controller 120 may collect at least one second packet to find an empty channel, and assign the empty channel as the channel of the first terminal 100D.

Here, assigning of a certain channel as the channel of the first terminal 100D may mean that the certain channel and identification (ID) information of the first terminal 100D are mapped to each other. The ID information of the first terminal 100D may include any one of an internet protocol (IP) address, a MAC address, and a name of the first terminal 100D.

When the first terminal 100D is added so as to replace an existing terminal due to malfunction of the existing terminal, the controller 120 may assign a channel of the existing terminal as the channel of the first terminal 100D. In this case, the ID information of the first terminal 100D and ID information of the existing terminal may be matched. When the first terminal 100D is added to expand a channel, the controller 120 may assign an empty channel that has not been assigned as the channel of the first terminal 100D.

In FIG. 4, the first terminal 100D is added to expand a channel, and the controller 120 may determine, based on the second packet received from the second terminal 100A, that a first channel 401 is assigned to the second terminal 100A. Also, the controller 120 may determine, based on the second packet received from the second terminal 100B, that a second channel 402 is assigned to the second terminal 100B. Accordingly, the controller 120 may set a third channel 403, which is an empty channel, as the channel of the first terminal 100D. In other words, the controller 120 may map the third channel 403 and the ID information of the first terminal 100D.

The first packet may be updated by adding the mapped ID information. Here, the controller 120 may update the first packet by adding mapping information of the first channel 401 and ID information of the second terminal 100A and mapping information of the second channel 402 and ID information of the second terminal 100B.

As such, according to an exemplary embodiment of the invention, a subject managing channels of terminals and a time slot may be set to be any one of the terminals such that a network is managed without a separate managing subject.

In addition, according to an exemplary embodiment of the invention, by continuously updating a managing subject, deterioration of a certain terminal may be prevented and a load may be distributed.

Also, according to an exemplary embodiment of the invention, channel information is used such that a new terminal is easily added when an existing terminal malfunctions.

Figure 5:
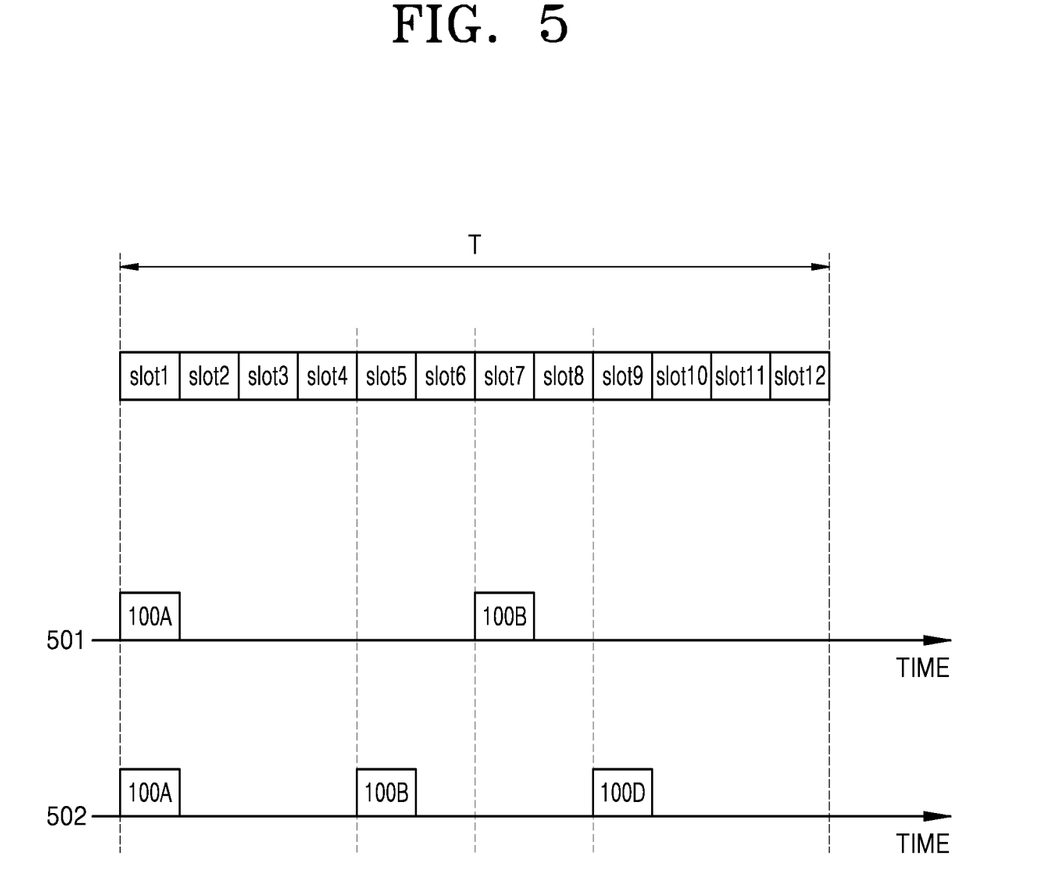
FIG. 5 is a diagram for describing a method of updating, by a controller, a time slot, according to an exemplary embodiment of the invention.

FIG. 5 is a diagram for describing a method of updating, by the controller 120, a time slot, according to an exemplary embodiment of the invention. For convenience of description, as described above in FIG. 3B, it is assumed that the first terminal 100D is connected to a network while the second terminals 100A and 100B are connected to the network.

The controller 120 may update a time slot in which image transmitting points of time of the second terminals 100A and 100B and an image transmitting point of time of the first terminal 100D are assigned according to a pre-set method, based on at least one second packet. Here, the pre-set method may be assigning of the image transmitting points of time such that time intervals of transmitting I-frames of images obtained by the first terminal 100D and the second terminals 100A and 100B are largest.

As described above, since capacity of an I-frame may be relatively large, a time interval of transmitting such I-frames may be set to be largest such that a network is not rapidly loaded beyond a design capacity.

In FIG. 5, before the first terminal 100D is newly added as in a time line 501, a time interval of transmitting I-frames of the second terminals 100A and 100B may consist of 6 slots. In other words, the second terminal 100A may transmit the I-frame at a point of time corresponding to a slot 1 in one period T, and the second terminal 100B may transmit the I-frame at a point of time corresponding to a slot 7 in the period T.

However, when the first terminal 100D is newly added, as in a time line 502, time intervals of transmitting I-frames of the first terminal 100D and the second terminals 100A and 100B may be 4 slots. In other words, the second terminal 100A may transmit the I-frame at the point of time corresponding to the slot 1 in the period T, the second terminal 100B may transmit the I-frame at a point of time corresponding to a slot 5 in the period T, and the first terminal 100D may transmit the I-frame at a point of time corresponding to a slot 9 in the period T.

According to such a structure, the first terminal 100D and the second terminals 100A and 100B generate and transmit an image including an I-frame, a P-frame, and a B-frame according to uniform periods T to the external apparatus 200 through a network, and at this time, the period T may include 12 slots. Accordingly, the time intervals described above may vary according to a length of the period T and/or the number of terminals on the network.

The first terminal 100D and the second terminals 100A and 100B may transmit an image in its slot according to an updated time slot, to the external apparatus 200 through the network.

The controller 120 may broadcast a first packet, updated according to the above processes, to the network. Here, the updated first packet may include information about all items of a first packet, unlike in a first packet that is broadcast initially when the first terminal 100D is initially connected to the network. In other words, the updated first packet may include channels and updated time slots of the first terminal 100D and the second terminals 100A and 100B.

Upon receiving the updated first packet, the second terminals 100A and 100B may update its setting information based on the updated first packet, as will be described later.

Since the updated first packet may be a packet requesting at least one terminal for a response packet (a second packet or a third packet as described below), the second terminals 100A and 100B may transmit a third packet to the first terminal 100D in response to the updated first packet. In other words, the controller 120 of the first terminal 100D may receive at least one third packet transmitted from at least one of the second terminals 100A and 100B on the network in response to the updated first packet.

The controller 120 may determine a malfunction of the at least one of the second terminals 100A and 100B based on the received at least one third packet. For example, the controller 120 may determine that a certain terminal malfunctions when a third packet is not received from the certain terminal. Also, the controller 120 may determine that a certain terminal malfunctions when a time slot included in a third packet received from the certain terminal is different from a time slot included in the updated first packet.

The controller 120 may repeatedly broadcast an updated first packet and receive a third packet as such, thereby periodically determining a malfunction of the second terminals 100A and 100B.

Figure 6:
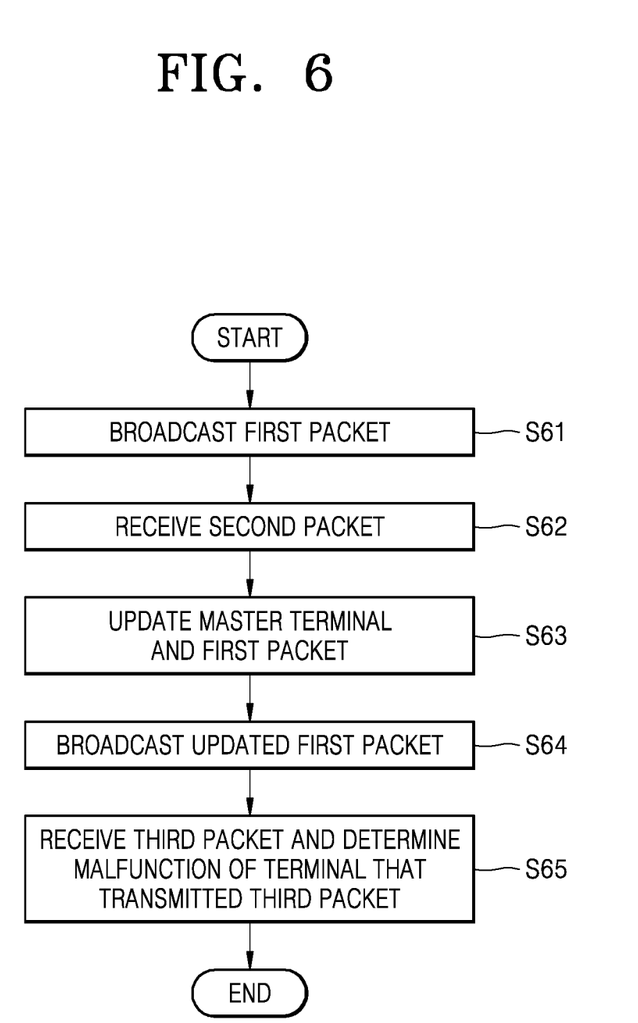
FIG. 6 and FIG. 7 are flowcharts of a network managing method performed by a controller, according to an exemplary embodiment of the invention.
Figure 7:
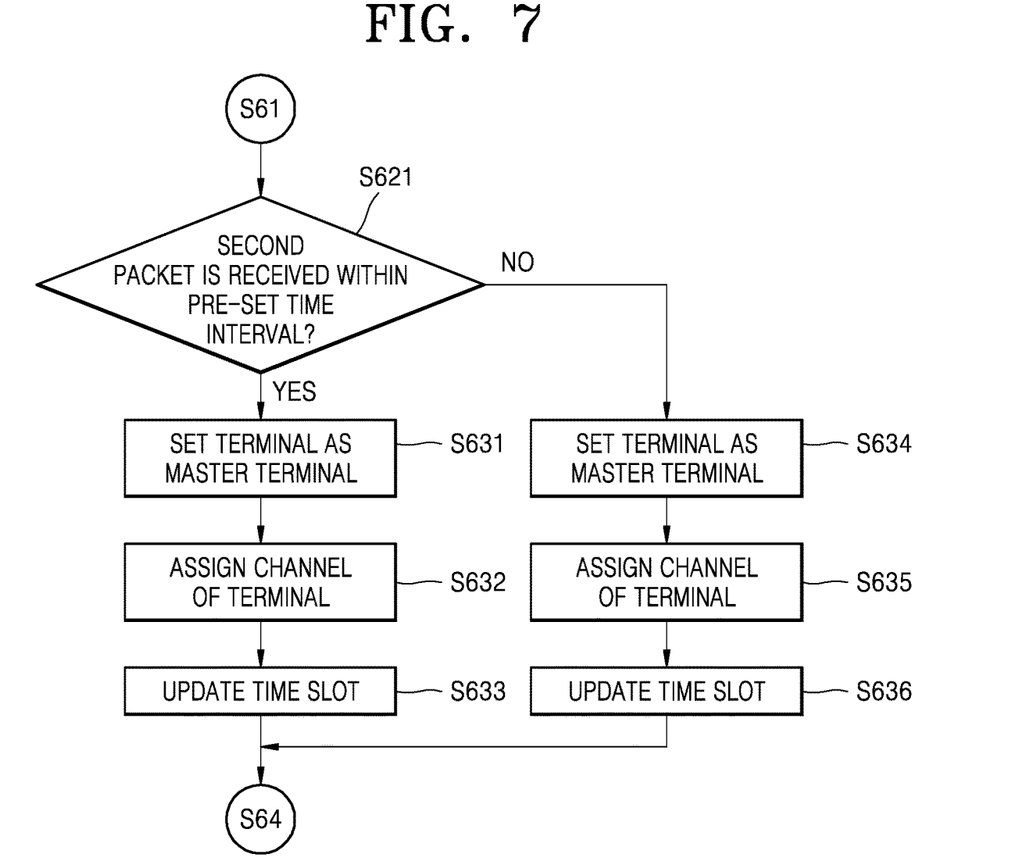

FIGS. 6 and 7 are flowcharts of a network managing method performed by the controller 120, according to an exemplary embodiment of the invention. Hereinafter, details overlapping those described with reference to FIGS. 1 through 5 will not be repeated.

When the first terminal 100C is connected to a network, the controller 120 of the first terminal 100C may broadcast a first packet to the network, in operation S61.

Herein, the broadcasting of the first packet may mean that the first terminal 100C transmits the first packet to at least one terminal connected to the network. In other words, the first terminal 100C may transmit the first packet to the at least one terminal on the network to notify the at least one terminal that the first terminal 100C has been newly added.

Here, the first packet may be a packet requesting another at least one terminal on the network for a response packet (a second packet or a third packet described below). The first packet may include at least one of a channel of the first terminal 100C that has been newly added, a channel of the other at least one terminal on the network, a time slot in which image transmitting points of time of terminals on the terminal are assigned, and an updating point of time of a master terminal. However, the first packet that is initially transmitted by the first terminal 100C when the first terminal 100C is newly added to the network may not include information about some of the above items. Information about items, which is not included in the first packet, may be updated based on a second packet received from another terminal on the network later, as will be described below.

The controller 120 may receive a second packet in operation S62, which is transmitted by another terminal on the network in response to the first packet. Also, the controller 120 may update a master terminal and the first packet in operation S63, based on at least one of whether a second packet is received, information of the first terminal 100 C, and at least one second packet.

For example, the controller 120 may determine whether a second packet is received within a pre-set time interval in operation S621, and when it is determined that the second packet is not received within the pre-set time interval, set the first terminal 100C as a master terminal in operation S634. As described above, when a second packet is not received within the pre-set time interval, the first terminal 100C may be an initial terminal connected to the network.

The controller 120 may initialize the first packet based on information of the first terminal 100C. In other words, the controller 120 may assign a channel of the first terminal 100C in operation S635 and update a time slot in operation S636.

For example, the controller 120 may initialize each item of the first packet to a blank and/or a very first setting value based on a premise that the first terminal 100C is one and only terminal existing on the network. For example, the controller 120 may set a first channel as a channel of the first terminal 100C by referring to channel information included in the first packet, and initialize remaining channels to blanks. Also, the controller 120 may assign a very first slot of the time slot included in the first packet to an image transmitting point of time of the first terminal 100C.

When it is determined that the second packet is received within the pre-set time interval in operation S621, the controller 120 may set the first terminal 100D as a master terminal in operation S631. In other words, the controller 120 may set the first terminal 100D as a master terminal when at least one second packet is received.

Also, the controller 120 may update the first packet based on information of the first terminal 100D and at least one second packet. For example, in operation S632, the controller 120 may assign a channel of the first terminal 100D based on the second packet. Here, the controller 120 may assign a channel of the other at least one terminal based on the second packet.

For example, referring to FIG. 4, the controller 120 of the first terminal 100D may assign an empty channel as the channel of the first terminal 100D by referring to the second packets transmitted by the second terminals 100A and 100B. For example, as described above, the second packets are response packets with respect to the first packet, and may include the channels of the second terminals 100A and 100B that transmitted the second packets. Accordingly, the controller 120 of the first terminal 100D may determine an empty channel by collecting at least one second packet and assign the empty channel as a channel of the first terminal 100D.

When the first terminal 100D is added to replace an existing terminal due to malfunction of the existing terminal, the controller 120 may assign a channel of the existing terminal as the channel of the first terminal 100D. In this case, the ID information of the first terminal 100D may be identical to ID information of the existing terminal. When the first terminal 100D is added to expand a channel, the controller 120 may assign an empty channel that has not been assigned as the channel of the first terminal 100D.

In FIG. 4, the first terminal 100D is added to expand a channel, and the controller 120 may determine, based on the second packet received from the second terminal 100A, that the first channel 401 is assigned to the second terminal 100A. Also, the controller 120 may determine, based on the second packet received from the second terminal 100B, that the second channel 402 is assigned to the second terminal 100B. Accordingly, the controller 120 may set the third channel 403 that is an empty channel as the channel of the first terminal 100D. In other words, the controller 120 may map the third channel 403 and the ID information of the first terminal 100D.

The first packet may be updated by adding the mapped ID information. Here, the controller 120 may update the first packet by adding mapping information of the first channel 401 and ID information of the second terminal 100A and mapping information of the second channel 402 and ID information of the second terminal 100B.

As such, according to an exemplary embodiment of the invention, a subject managing channels of terminals and a time slot may be set to be any one of the terminals such that a network is managed without a separate managing subject.

In addition, according to an exemplary embodiment of the invention, by continuously updating a managing subject, deterioration of a certain terminal may be prevented and a load may be distributed.

Also, according to an exemplary embodiment of the invention, channel information is used such that a new terminal is easily added when an existing terminal malfunctions.

Referring to FIG. 7, the controller 120 may update a time slot in which an image transmitting point of time of the other at least one terminal and an image transmitting point of time of the first terminal 100D are assigned according to a pre-set method, based on the at least one second packet, in operation S633.

For example, referring to FIG. 5, the controller 120 may update the time slot in which the image transmitting points of time of the second terminals 100A and 100B and the image transmitting point of time of the first terminal 100D are assigned according to the pre-set method, based on the at least one second packet. Here, the pre-set method may include assigning of the image transmitting points of time such that time intervals of transmitting I-frames of images obtained by the first terminal 100D and the second terminals 100A and 100B are largest.

As described above, since the capacity of an I-frame may be relatively large, a time interval of transmitting such I-frames may be set to be largest such that a network is not rapidly loaded beyond a design capacity.

In FIG. 5, before the first terminal 100D is newly added as in the time line 501, the time interval of transmitting the I-frames of the second terminals 100A and 100B may be 6 slots. In other words, the second terminal 100A may transmit the I-frame at a point of time corresponding to the slot 1 in the period T, and the second terminal 100B may transmit the I-frame at a point of time corresponding to the slot 7 in the period T.

However, when the first terminal 100D is newly added as in the time line 502, the time intervals of transmitting the I-frames of the first terminal 100D and the second terminals 100A and 100B may be 4 slots. In other words, the second terminal 100A may transmit the I-frame at the point of time corresponding to the slot 1 in the period T, the second terminal 100B may transmit the I-frame at a point of time corresponding to the slot 5 in the period T, and the first terminal 100D may transmit the I-frame at a point of time corresponding to the slot 9 in the period T.

According to such a structure, the first terminal 100D and the second terminals 100A and 100B generate and transmit an image including an I-frame, a P-frame, and a B-frame according to uniform periods T to the external apparatus 200 through a network, and at this time, the period T may include 12 slots. Accordingly, the time intervals described above may vary according to a length of the period T and/or the number of terminals on the network.

The first terminal 100D and the second terminals 100A and 100B may transmit an image in its slot according to an updated time slot, to the external apparatus 200 through the network.

The controller 120 may broadcast the first packet updated according to above processes, to the network, in operation S64. Here, the updated first packet may include information about all items of a first packet, unlike in a first packet that is broadcast initially when the first terminal 100D is initially connected to the network.

The second terminal 100A or 100B that received the updated first packet may update its setting information based on the updated first packet, as will be described later.

Since the updated first packet may be a packet requesting at least one terminal for a response packet (a second packet or a third packet as described below), the second terminal 100A or 100B that received the updated first packet may transmit a third packet to the first terminal 100D in response to the updated first packet.

In other words, the controller 120 of the first terminal 100D may receive at least one third packet transmitted from at least one of terminals on the network in response to the updated first packet, in operation S65.

The controller 120 may determine malfunction of the at least one of the terminals that transmitted the at least one third packet based on the received at least one third packet. For example, the controller 120 may determine that a certain terminal malfunctions when a third packet is not received from the certain terminal. Also, the controller 120 may determine that a certain terminal malfunctions when a time slot included in a third packet received from the certain terminal is different from a time slot included in the updated first packet.

The controller 120 may repeatedly broadcast an updated first packet and receive a third packet as such, thereby periodically determining malfunction of another terminal.

<Second Terminal>

Hereinabove, a first terminal that broadcasts a first packet to a network has been described. Now, a second terminal that receives the first packet broadcast by the first terminal and transmits a second packet to the first terminal in response to the first packet will be described.

As described above, the first terminal may be a terminal newly added to the network, and the second terminal may be a terminal pre-existing in the network. However, herein, the first and second terminals are classified according to functions for convenience of description, and thus, may have the same structure as each other.

Figure 8:
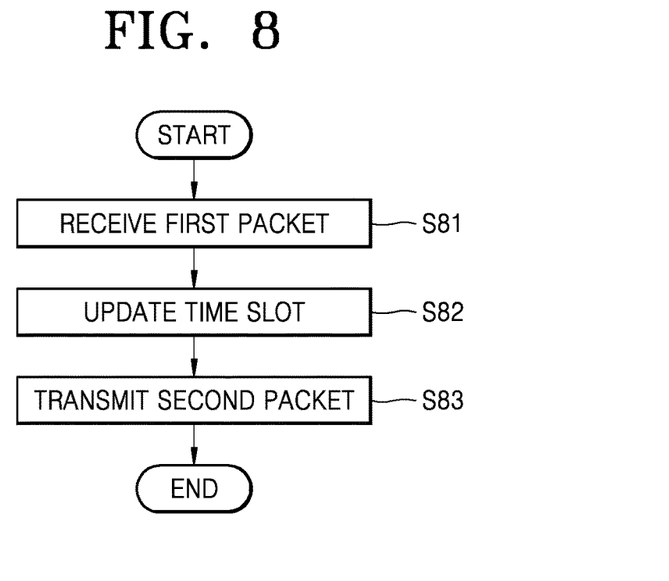
FIG. 8 is a flowchart of a network managing method performed by a controller of a second terminal, according to an exemplary embodiment of the invention.

FIG. 8 is a flowchart of a network managing method performed by a controller of a second terminal, according to an exemplary embodiment of the invention.

The controller of the second terminal may receive a first packet broadcast by a first terminal through a network, in operation S81. Also, the controller may update a time slot based on the received first packet in operation S82.

As described above, the first terminal updates the first packet and broadcasts the updated first packet to the network, and thus the controller may receive such an updated first packet and update the time slot of the second terminal by referring to a time slot in the received first packet.

For example, when a current time slot of the second terminal and the times slot in the received first packet are different from each other, the controller may update the current time slot of the second terminal to the time slot in the received first packet. In other words, when the first terminal is added to the network, the controller of the second terminal may update its time slot by referring to the time slot of the first terminal, which has been newly assigned according to the addition of the first terminal to the network.

For example, as shown in FIG. 5, assume that the time slots of the second terminals 100A and 100B are as shown in the time line 501 before the first terminal 100D is newly added. In other words, the time interval of transmitting the I-frames of the second terminals 100A and 100B is 6 slots.

Here, when the first terminal 100D is newly added, as shown in the time line 502, the second terminals 100A and 100B may receive an updated first packet from the first terminal 100D, and update the time slot by referring to the updated first packet. In other words, the time slot of the second terminals 100A and 100B may be updated to 4 slots that is a time interval of transmitting the I-frames of the first terminal 100D and the second terminals 100A and 100B.

Then, the controller of the second terminal may transmit, to the first terminal, a second packet including at least one of the updated time slot and a channel of the second terminal, in operation S83. The transmitted second packet may be used by the first terminal to determine malfunction of the second terminal.

The controller of the second terminal may determine whether a master terminal satisfies a master terminal changing condition. For example, when a master terminal is changed at regular time periods according to an order of channels, the master terminal changing condition may be a lapse of a certain period of time.

When the master terminal satisfies the master terminal changing condition, the controller of the second terminal may transmit a fourth packet to the master terminal. Here, the fourth packet may include at least one of a channel of the second terminal and information about changing of a master terminal.

Then, the controller of the second terminal may update the master terminal to the second terminal, update the first packet based on information of the second terminal, and broadcast the updated first packet to the network. The updating of the master terminal, the updating of the first packet, and the broadcasting of the updated first packet, which are performed by the controller, have been described above, and thus details thereof are not provided again.

According to exemplary embodiments of the invention, by distributing points of time when a plurality of image obtaining apparatuses transmit I-frames, a network managing method and an image obtaining apparatus, which efficiently use a network, may be realized.

Also, a network managing method and an image obtaining apparatus, which manage a network by only using an image obtaining apparatus without a separate managing subject, may be realized.

Also, a network managing method and an image obtaining apparatus, which prevent deterioration of a certain image obtaining apparatus by continuously updating a managing subject, may be realized.

The network managing method according to the inventive concepts may also be embodied as computer-readable codes on a non-transitory computer-readable recording medium. The non-transitory computer-readable recording medium is any data storage device that can store data which can be thereafter read by a computer system. Examples of the non-transitory computer-readable recording medium include read-only memory (ROM), random-access memory (RAM), CD-ROMs, magnetic tapes, floppy disks, optical data storage devices, etc. The non-transitory computer-readable recording medium can also be distributed over network coupled computer systems so that the computer-readable code is stored and executed in a distributed fashion. Also, functional programs, codes, and code segments for accomplishing the present disclosure can be easily construed by programmers skilled in the art to which the present disclosure pertains.

It should be understood that exemplary embodiments of the invention described herein should be considered in a descriptive sense only and not for purposes of limitation. Descriptions of features or aspects within each embodiment should typically be considered as available for other similar features or aspects in other embodiments.

While one or more exemplary embodiments of the invention have been described with reference to the figures, it will be understood by those of ordinary skill in the art that various changes in form and details may be made therein without departing from the spirit and scope of the disclosure as defined by the following claims.

What is claimed is:

1. A method of managing a network performed by a first terminal, the method comprising:
   the first terminal broadcasting a first packet to the network when the first terminal is being newly connected to the network;
   the first terminal receiving at least one second packet transmitted by at least one second terminal in the network and the second packet includes an image transmitting point of time of the first terminal;
   the first terminal updating the first packet on which of the first terminal and the at least one second terminal is designated as a master terminal in the network;
   the first terminal broadcasting the updated first packet to the network;
   wherein the first terminal and the at least one second terminal each comprise an image obtaining apparatus;
   wherein the first packet comprises a channel of the first terminal, a channel of each of the at least one second terminal, and a time slot;
   wherein the updating of the first packet comprises:
     determining the channel of each of the at least one second terminal based on the at least one second packet, and
     assigning the channel of the first terminal based on the at least one second packet;
   wherein updating the time slot in which an image transmitting point of time of the at least one second terminal that transmitted the at least one second packet and an image transmitting point of time of the first terminal are assigned according to a pre-set method, based on the at least one second packet; and
   wherein the pre-set method comprises setting the image transmitting points of time such that a time interval of transmitting I-frames of images obtained by the first terminal and the at least one second terminal is largest.

2. The method of claim 1, wherein, in response to the at least one second packet not being received within a pre-set time interval from a point of time when the first packet was broadcast, the updating of the master terminal and the first packet comprises:
   setting the first terminal as the master terminal; and
   initializing the first packet based on information of the first terminal.

3. The method of claim 1, wherein the first terminal updating of the first packet further comprises the first terminal finding an empty channel in the second packet, and assigning the empty channel as the channel of the first terminal.

4. The method of claim 1, wherein, after broadcasting of the updated first packet to the network, the method further comprises:
   receiving at least one third packet transmitted from the at least one second terminal on the network in response to the updated first packet; and
   determining a malfunction of the at least one second terminal based on the at least one third packet wherein a time slot included in the third packet received from the at least one second terminal is different from the time slot included in the updated first packet.

5. The method of claim 1, wherein the pre-set method comprises setting the image transmitting points of time such that a time interval of transmitting I-frames of images obtained by the first terminal and the at least one second terminal is determined by dividing the total number of slots in a period T by the number of terminals on the network.

6. A method of managing a network performed by a first terminal, the method comprising:
the first terminal broadcasting a first packet to the network;
the first terminal receiving at least one second packet transmitted by at least one second terminal in the network, in response to the first packet;
the first terminal updating, based on the at least one second packet, a master terminal in the network and the first packet;
the first terminal broadcasting the updated first packet to the network;
wherein, in response to the at least one second packet being received, the updating of the master terminal and the first packet comprises:
setting, by the first terminal, the first terminal as the master terminal such that the master terminal is updated from one of the at least one second terminals to the first terminal; and
updating, by the first terminal, the first packet based on at least one of information of the first terminal and the at least one second packet;
wherein the first terminal and the at least one second terminal each comprises an image obtaining apparatus;
wherein the first packet comprises a channel of the first terminal, a channel of each of the at least one second terminal, and a time slot;
wherein the updating of the first packet comprises:
determining the channel of each of the at least one second terminal based on the at least one second packet, and
assigning the channel of the first terminal based on the at least one second packet;
wherein updating the time slot in which an image transmitting point of time of the at least one second terminal that transmitted the at least one second packet and an image transmitting point of time of the first terminal are assigned according to a pre-set method, based on the at least one second packet; and
wherein the pre-set method comprises setting the image transmitting points of time such that a time interval of transmitting I-frames of images obtained by the first terminal and the at least one second terminal is largest.

7. The method of claim 6, wherein the first terminal updating of the first packet further comprises the first terminal finding an empty channel in the second packet, and assigning the empty channel as the channel of the first terminal.

8. The method of claim 6, wherein, after broadcasting of the updated first packet to the network, the method further comprises:
receiving at least one third packet transmitted from the at least one second terminal on the network in response to the updated first packet; and
determining a malfunction of the at least one second terminal based on the at least one third packet wherein a time slot included in the third packet received from the at least one second terminal is different from the time slot included in the updated first packet.

9. The method of claim 6, wherein the pre-set method comprises setting the image transmitting points of time such that a time interval of transmitting I-frames of images obtained by the first terminal and the at least one second terminal is determined by dividing the total number of slots in a period T by the number of terminals on the network.

10. A first image obtaining apparatus including a lens and an image sensor, the first image obtaining apparatus comprising a controller configured to:
a controller broadcasting a first packet to a network;
the controller receiving at least one second packet transmitted by at least one second image obtaining apparatus in the network in response to the first packet;
the controller updating a master terminal in the network and the first packet based on the at least one second packet; and
the controller broadcasting the updated first packet to the network,
wherein updating the first packet comprises:
updating, based on the second packet, a second time slot in which a second image frame is transmitted by the at least one second terminal and updating a first time slot in which a first image frame is transmitted by the at least one first terminal such that the second image frame and the first image frame are not transmitted in a same time slot, and
wherein the first and second image frames are I-frames of images obtained by the first terminal and the at least one second terminal, and the first and second time slots are set such that a time interval of transmitting the first and second image frames of images obtained by the first terminal and the at least one second terminal is largest.

11. The first image obtaining apparatus of claim 10, wherein, in response to the at least one second packet not being received within a pre-set time interval after the first packet was broadcast, the controller is further configured to:
set the first image obtaining apparatus as the master terminal; and
initialize the first packet based on information of the first image obtaining apparatus.

12. The first image obtaining apparatus of claim 10, wherein, in response to the at least one second packet being received, the controller is further configured to:
set the first image obtaining apparatus as the master terminal; and
update the first packet based on at least one of information of the first image obtaining apparatus and the at least one second packet.

13. The first image obtaining apparatus of claim 10, wherein the time interval of transmitting I-frames of images obtained by the first terminal and the at least one second terminal is determined by dividing the total number of slots in a period T by the number of terminals on the network.

14. The first image obtaining apparatus of claim 10, wherein the controller is further configured to:
receive at least one third packet transmitted by the at least one second image obtaining apparatus on the network in response to the updated first packet; and
determine a malfunction of the at least one second image obtaining apparatus based on the at least one third packet wherein a time slot included in the third packet received from the at least one second terminal is different from the time slot included in the updated first packet.

* * * * *